US008554171B2

(12) United States Patent
Sennett et al.

(10) Patent No.: US 8,554,171 B2
(45) Date of Patent: *Oct. 8, 2013

(54) SYSTEMS AND METHODS FOR IDENTIFYING A GEOGRAPHICAL AREA IN A COMMERCIAL MOBILE ALERT SERVICE MESSAGE

(75) Inventors: Dewayne Sennett, Redmond, WA (US); Brian K. Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,477

(22) Filed: Jul. 11, 2012

(65) Prior Publication Data
US 2012/0276866 A1 Nov. 1, 2012

Related U.S. Application Data

(63) Continuation of application No. 12/571,572, filed on Oct. 1, 2009, now Pat. No. 8,224,285.

(51) Int. Cl.
*H04M 11/04* (2006.01)

(52) U.S. Cl.
USPC .......... 455/404.1; 725/33; 701/213; 455/3.01

(58) Field of Classification Search
USPC ............................................. 455/404.1, 414.1
See application file for complete search history.

(56) References Cited

U.S. PATENT DOCUMENTS

| 5,121,430 | A * | 6/1992 | Ganzer et al. ................ 380/258 |
| 7,725,256 | B2 * | 5/2010 | Marsh ........................... 701/515 |
| 8,224,285 | B2 | 7/2012 | Sennett et al. |
| 2004/0103158 | A1 | 5/2004 | Vella et al. |
| 2006/0040639 | A1 | 2/2006 | Karl et al. |
| 2007/0004377 | A1 * | 1/2007 | Medford et al. ........... 455/404.1 |
| 2009/0291630 | A1 * | 11/2009 | Dunn et al. ................... 455/3.01 |
| 2009/0307720 | A1 * | 12/2009 | Turner ............................. 725/33 |
| 2010/0075626 | A1 * | 3/2010 | Titus et al. ................ 455/404.1 |
| 2010/0105351 | A1 * | 4/2010 | Xu et al. .................... 455/404.1 |

FOREIGN PATENT DOCUMENTS

WO    WO 2011/041357    4/2011

OTHER PUBLICATIONS

International Patent Application No. PCT/US2010/050644: International Search Report dated Dec. 22, 2010, 9 pages.
"Codes for the Identification of the States, The District of Columbia and the Outlying Areas of the United States, and Associated Areas," Federal Information Processing Standards Publication 5-2, May 28, 1987, 8 pages.
"Counties and Equivalent Entities of the United States, Its Possessions, and Associated Areas," Federal Information Processing Standards Publication 6-4, Aug. 31, 1990, 9 pages.

* cited by examiner

*Primary Examiner* — Wesley Kim
*Assistant Examiner* — Joseph Dean, Jr.
(74) *Attorney, Agent, or Firm* — Woodcock Washburn LLP

(57) ABSTRACT

Geographical locations can be encoded in alert messages and the encoded geographical locations can be processed are disclosed. Emergency alerts can be received from an emergency provider or governmental agency comprising a geographical code. The code can be evaluated to determine a geographical location by determining a primary location, such as a state or region, and a secondary location such as a county. This information can be used to determine the devices within a wireless network that should receive the alert message.

20 Claims, 7 Drawing Sheets

SYSTEMS AND METHODS FOR IDENTIFYING A GEOGRAPHICAL AREA IN A COMMERCIAL MOBILE ALERT SERVICE MESSAGE

CROSS REFERENCE TO RELATED APPLICATIONS

This application is a continuation of, and claims priority to, U.S. patent application Ser. No. 12/571,572, now U.S. Pat. No. 8,224,285, filed on Oct. 1, 2009 and entitled "Systems and Methods for Identifying a Geographical Area in a Commercial Mobile Alert Service Message", which is hereby incorporated by reference in its entirety.

BACKGROUND

The Commercial Mobile Alert System (CMAS) was established by the Federal Communications Commission (FCC) to allow wireless service providers to send emergency alerts to their subscribers. Such alerts are initially intended to be in the form of text messages, but may also take the form of audio and video alerts. The CMAS network will allow emergency services agencies, such as the Federal Emergency Management Agency (FEMA), to accept and aggregate alerts from federal, state, and local emergency operations centers, and send the alerts over a secure interface to wireless providers. The wireless providers can then distribute the alerts to their customers.

Emergency alerts issued by emergency services agencies may be intended to reach users in a specific geographical area. For instance, in the event of an impending potential natural disaster such as a hurricane, an emergency service agency may wish to notify the populations of the counties that have been determined to be most likely to be impacted by the potential disaster.

There are currently three types of emergency alerts. Presidential Alerts relate to national emergencies, Imminent Threat Alerts relate to emergencies where life or property is at risk, such as hurricanes or tornadoes, and Child Abduction Emergency/AMBER Alerts relate to missing or endangered children due to an abduction or runaway situation. Subscribers may be able to opt-out of receiving Imminent Threat and Child Abduction/AMBER alerts, but may not be permitted to opt-out of Presidential Alerts.

SUMMARY

Systems and methods are disclosed for encoding a geographical location in an emergency alert. In one embodiment, a geographical location code, or geocode, includes two sections. The first section may indicate a larger geographical region, such as a state, group of states, or section of a country. The second section may indicate a smaller geographical region, such as county or equivalent area. In some embodiments, specific codes may indicate the entire country or an entire region or area of the country. In one embodiment, the first section may consist of two characters or digits and the second section may consist of three characters or digits.

Systems and methods are also disclosed for interpreting geocodes. In one embodiment, a received emergency alert containing a geocode is processed and the region represented by the geocode is determined. Based on that determination, specific devices within a network are determined that are in, or otherwise service, the geographical region specified by a geocode. A broadcast message including contents of the emergency alert may then be sent to such devices, and those devices may transmit the broadcast message to users' devices in the geographical region. Other embodiments and aspects of the present disclosure are also described herein.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

In one embodiment, CMAS emergency alerts may be provided using Universal Mobile Telecommunications System (UMTS) and/or Global System for Mobile communications (GSM) cell broadcast technologies. This disclosure provides methods and systems for encoding a geographical area in a CMAS emergency alert, and methods and systems for processing a CMAS emergency alert containing an indication of a geographical area.

Figure 1:
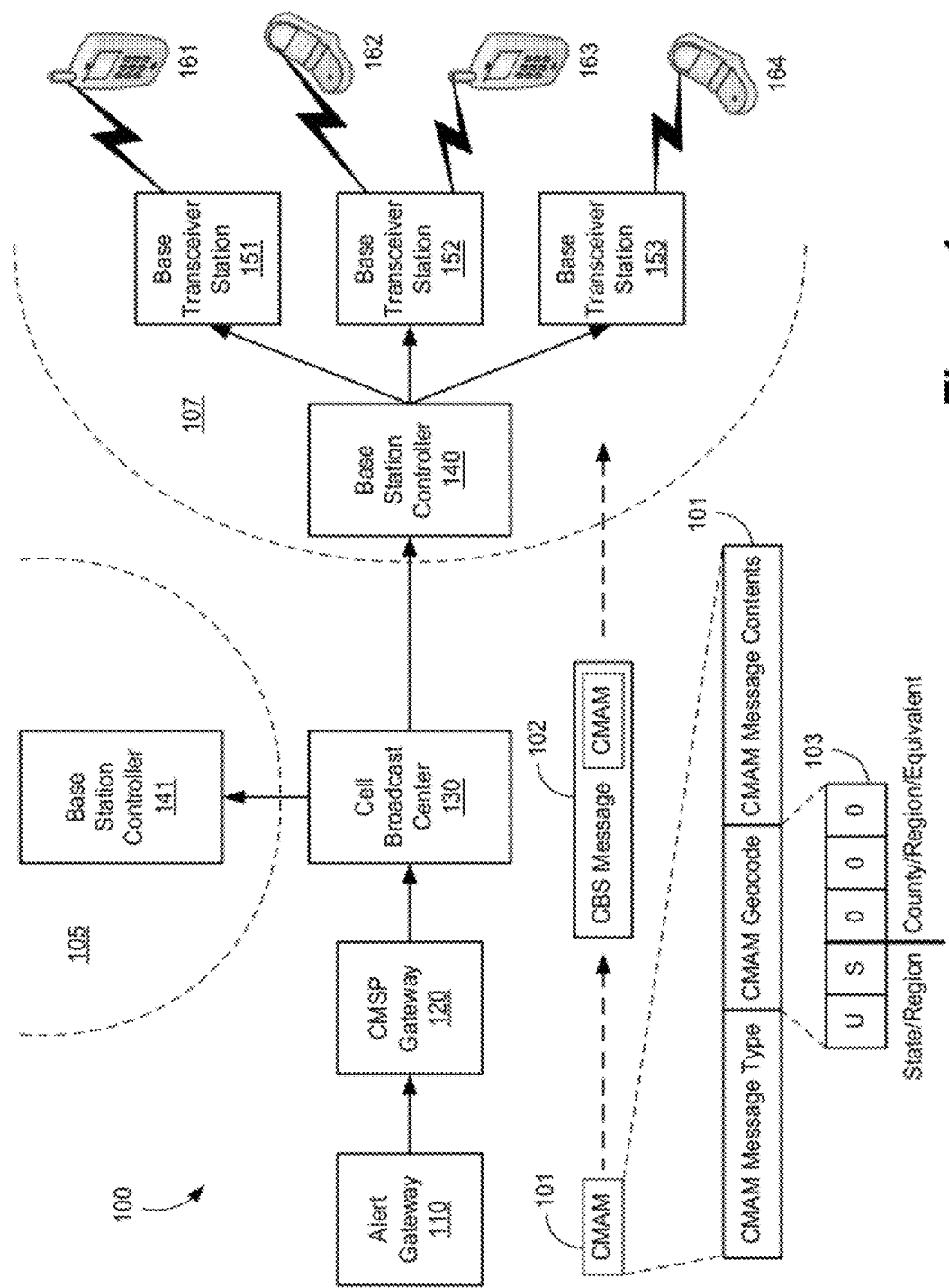
FIG. 1 is a block diagram of a non-limiting, exemplary system architecture in which systems and methods for identifying a geographical area in a commercial mobile alert service message may be implemented.

FIG. 1 illustrates an exemplary architecture 100 that may be used to provide emergency alerts to mobile devices using GSM, UMTS, or other wireless network technologies. An alert generated by a governmental or emergency services agency may be referred to as a Commercial Mobile Alert Message (CMAM). CMAM 101 may be generated at or otherwise provided to a wireless carrier or wireless service provider, referred to herein as a Commercial Mobile Service Provider (CMSP), by Alert Gateway 110, which may be a Commercial Mobile Alert System (CMAS) alert gateway, and may be operated by a governmental or emergency services agency. Alert Gateway 110 may transmit CMAM 101 to CMSP Gateway 120. CMSP Gateway 120 may be dedicated to receiving CMAMs from one or more alert gateways such as Alert Gateway 110, and may communicate with Alert Gateway 110 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, CMAM 101 may be generated and/or transmitted from Alert Gateway 110 to CMSP Gateway 120, and may be limited to 90 characters and may be based on Common Alert Protocol (CAP) key fields. In one embodiment, CMAM 101 may include a message type, for example indicating that CMAM 101 is one of a "CMAS-Presidential", "CMAS-Extreme-Alert-Message", "CMAS-Severe-Alert-Message", or "CMAS-Amber-Alert" type message. Other message types are also contemplated. CMAM 101 may also include message contents that are intended for display to users receiving the message.

In one embodiment, CMAM 101 includes geocode 103, which may be generated by Alert Gateway 110 or any other device within or communicatively connected to the CMAS. Geocode 103 may be generated automatically, based on user input, or a combination of both. Geocode 103 may be referred to as a "CMAC_cmas_geocode". Geocode 103 may be five characters in length. Such characters may be letters or numbers, or a combination of both. Such characters may be represented in ASCII codes, binary representations, or any other form or representation that allows such a code to be identified and read by computing devices. The first two characters or digits of geocode 103 may identify the state or region of a geographical area. The last three characters or digits of geocode 103 may identify a specific county, region, or equivalent entities within the state or region identified by the first two characters or digits. Other quantities of characters or digits used to represent a geographical area, and other combinations of state, region, and geographical area identifiers are contemplated as within the scope of the present disclosure.

In one embodiment, the first two digits or characters of geocode 103 may contain an indication for a state that follows the two digit FIPS State Numeric Code as defined in Federal Information Processing Standard 5-2 (FIPS 5-2), titled "Codes for the Identification of the States, the District of Columbia and the Outlying Areas of the United States, and Associated Areas", dated 28 May 1987. In such an embodiment, if the last three characters or digits of geocode 103 are three zeroes (000), such a geocode may indicate that the entire state as specified by the first two digits or characters is the area of concern for the alert.

In one embodiment, where the last three characters or digits of geocode 103 are not three zeroes, the last three characters or digits of geocode 103 may contain an indication for a specific county as defined in Federal Information Processing Standard 6-4 (FIPS 6-4), titled "Counties and Equivalent Entities of the United States, Its Possessions, and Associated Areas", dated 31 Aug. 1990.

In one embodiment, an alert message intended for the entire United States including all states, the District of Columbia, possessions, and associated areas will be identified by the first two digits or characters of geocode 103 being set to "US" and the last three characters or digits of geocode 103 being set to "000", resulting in geocode 103 containing the code "US000".

In one embodiment, alerts may be targeted for regions of the country (such as the Gulf States). In such an embodiment, geocode values for regional areas such as FEMA regions or National Weather Service (NWS) regions may be used to construct a geocode such as geocode 103. FEMA regions may be assigned values in the format of "US0xx", while and the NWS regions may be assigned values in the format of "US1xx". In one embodiment, codes may be assigned as shown below in Table 1:

TABLE 1

Geocode Assignments

| Geocode | Definition |
| --- | --- |
| 00000 | Not Used |
| 00001 thru 99999 | For Identification of states and counties |
| US000 | Entire United States |
| US001 | FEMA Region 1 (Maine, Vermont, New Hampshire, Rhode Island, Massachusetts, and Connecticut) |
| US002 | FEMA Region 2 (New York, New Jersey, Puerto Rico, and Virgin Islands) |
| US003 | FEMA Region 3 (Delaware, District of Columbia, Maryland, Pennsylvania, Virginia, and West Virginia) |
| US004 | FEMA Region 4 (Alabama, Florida, Georgia, North Carolina, South Carolina, Tennessee, Kentucky, and Mississippi) |
| US005 | FEMA Region 5 (Illinois, Indiana, Michigan, Minnesota, Ohio, and Wisconsin) |
| US006 | FEMA Region 6 (Arkansas, Louisiana, New Mexico, Oklahoma, and Texas) |
| US007 | FEMA Region 7 (Iowa, Kansas, Missouri, and Nebraska) |
| US008 | FEMA Region 8 (Colorado, Montana, North Dakota, South Dakota, and Utah) |
| US009 | FEMA Region 9 (Arizona, California, Hawaii, Nevada, American Samoa, Guam, Commonwealth of the Northern Mariana Islands, Republic of the Marshall Islands, and Federated States of Micronesia) |
| US010 | FEMA Region 10 (Alaska, Idaho, Oregon, and Washington) |
| US011 thru US100 | Not Assigned |
| US101 | National Weather Service (NWS) Central Region (Colorado, Illinois, Indiana, Iowa, Kansas, Kentucky, Michigan, Minnesota, Missouri, and Nebraska) |
| US102 | National Weather Service (NWS) Eastern Region (Maine, Maryland, Massachusetts, New Jersey, New York, North Carolina, Ohio, Pennsylvania, South Carolina, and Vermont) |
| US103 | National Weather Service (NWS) Southern Region (Alabama, Arkansas, Florida, Georgia, Louisiana, Mississippi, New Mexico, Oklahoma, Puerto Rico, Tennessee, and Texas) |
| US104 | National Weather Service (NWS) Western Region (Arizona, California, Idaho, Montana, Nevada, Oregon, Utah, and Washington) |
| US105 | National Weather Service (NWS) Alaska Region (Alaska) |
| US106 | National Weather Service (NWS) Pacific Region (Hawaii, Guam, America Samoa) |
| US107 thru US999 | Not Assigned |

Upon receiving CMAM 101 from Alert Gateway 110, CMSP Gateway 120 may process CMAM 101 to determine a set of the cells or nodes within the CMSP network that are to be provided with CMAM 101 for transmission to users and devices. Such processing may include determining geocode 103 from CMAM 101, and determining a specific geographic area or region where all users should receive the contents of CMAM 101 based on the geocode. For example, CMSP Gateway 120 may determine that CMAM 101, or the contents of CMAM 101, should be transmitted in region 107 based on geocode 103. CMSP Gateway 120 may also determine that CMAM 101, or the contents of CMAM 101, should not be transmitted in region 105 based on geocode 103. Alternatively, CMSP Gateway 120 may determine that users in all regions served by the CMSP network should receive the contents of CMAM 101.

In one embodiment, determining a set of cells or nodes may be performed by first determining the first two digits or characters of a geocode and determining the state or region of a geographical area. Next, the last three digits or characters may be determined, and then a specific county, region, or equivalent entities within the state or region identified by the first two characters or digits may be determined based on the area represented by the first two digits or characters. For example, if the first two digits or characters are determined to identify the state of Florida, processing may be implemented to search only counties in Florida for matches to the last three digits or characters of the geocode. Other searching optimization routines and algorithms are contemplated as within the scope of the present disclosure.

Such processing may further include determining specific cells, nodes, and/or devices that should receive the contents of CMAM 101. For example, if CMSP Gateway 120 determines that CMAM 101, or the contents of CMAM 101, should be transmitted in region 107 based on geocode 103, CMSP Gateway 120 may determine that Cell Broadcast Center 130, Base Station Controller 140, and/or Base Transceiver Stations 151, 152, and 153 should receive CMAM 101 and/or the contents of CMAM 101. Alternatively, CMSP Gateway 120 may determine a region or one or more particular devices within a region, such as Cell Broadcast Center 130 and/or Base Station Controller 140, that should receive the contents of CMAM 101, and those devices may determine particular other devices, such as Base Transceiver Stations 151, 152, and 153, that should also receive the contents of CMAM 101. In an alternative embodiment, CMSP Gateway 120 may merely forward the contents of CMAM 101 to a device, such as Cell Broadcast Center 130, that may then determine a region, device(s), etc. that should receive the contents of CMAM 101. Any other combination or order of determining the devices to receive a CMAM are contemplated. Such processing may be performed using database queries, algorithms, software programs, or any other means of correlating a code with one or more devices, nodes, cells, regions, etc.

Other processing that may be performed by CMSP Gateway 120 may include formatting CMAM 101 as necessary to provide the alert to mobile devices serviced by the CMSP. In the event that multiple CMAMs are received by CMSP Gateway 120, CMSP Gateway 120 will process the CMAMs in a first-in first-out manner, except for Presidential Alert CMAMs, which may be processed before all other non-Presidential Alert CMAMs. Alternatively, other priority schemes may be used that determine CMAM priority based on various characteristics of CMAMs.

Once CMAM 101 is processed, CMSP Gateway 120 may transmit processed CMAM 101 to Cell Broadcast Center 130. In an alternative embodiment, CMAM 101 may not be altered by CMSP Gateway 120, and may be transmitted to Cell Broadcast Center 130 unchanged. Cell Broadcast Center 130 may transmit CMAM 101 to Base Station Controller 140 as a cell broadcast service (CBS) message containing the contents of CMAM 101, such as CBS Message 102. In one embodiment, Cell Broadcast Center 130 may know to transmit CBS Message 102 based upon the region or device determination performed by CMSP Gateway 120, while in other embodiments, Cell Broadcast Center 130 may determine appropriate receiving devices for CBS Message 102 by processing geocode 103 itself. The contents of CMAM 101 and relevant data may be mapped to fields and/or parameters of a CBS message, such as a Write/Replace message of the Request/Indication primitive type as described in the 3GPP TS 23.041 v3.5.0 technical specification dated June 2006, which is hereby incorporated by reference in its entirety. Contents or data relating to CMAM 101 may be mapped to parameters of CBS Message 102. For example, a CMAM message type may by associated with the CBS message identifier parameter, and the CMAM message contents may be mapped to a CBS message information parameter. Attributes of CMAM 101, such as the CMAM message type, may be derived from CMAM 101 by Cell Broadcast Center 130 and inserted into CBS message 102, mapped directly from CMAM 101 to CBS Message 102, or determined from CMAM 101 and included or not included in CBS Message 102 as desired. Other mappings and processing may be used to map or derive CMAM data for the generation of a CBS message, and all such mappings and processing are contemplated as within the scope of the present disclosure.

Upon receipt of CBS Message 102, Base Station Controller 140 may transmit CBS Message 102 to the appropriate base stations, such as Base Transceiver Stations 151, 152, and 153. Base Station Controller 140 may determine the appropriate base station transceivers based on geocode 103, or may transmit CBS Message 102 to a predefined set of base station transceivers by default. Base Transceiver Stations 151, 152, and 153 may transmit CBS Message 102 to mobile equipment (ME) such as wireless devices 161, 162, 163, and 164, thereby alerting the users of these devices to the contents of CMAM 101 represented by or contained with CBS message 102.

In one embodiment, where the CMSP network includes UMTS technology, Base Station Controller 140 may be a UMTS Terrestrial Radio Access Network (UTRAN) that may include a Radio Network Controller. Such a Radio Network Controller may provide control functionality for UMTS Node Bs that serve as base transceiver stations. Base Transceiver Stations 151, 152, and 153 may be Node Bs in such a UMTS network and may transmit CBS Message 102 to wireless devices 161, 162, 163, and 164.

Figure 2:
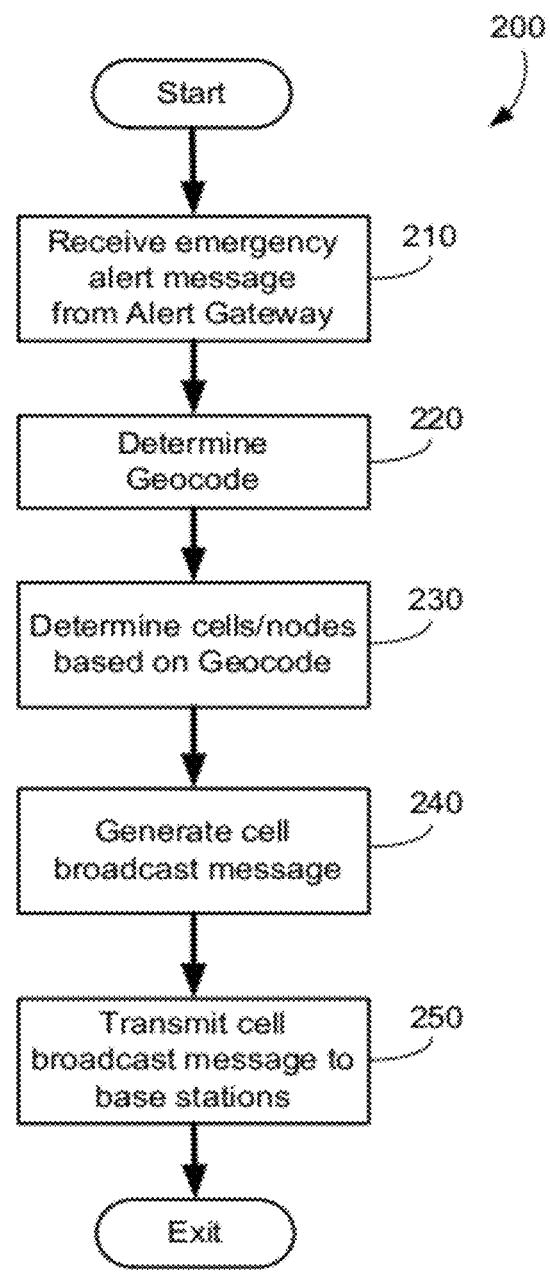
FIG. 2 is a flow chart of a non-limiting, exemplary method of processing an emergency alert message based on a geographical area identified in the emergency alert.

FIG. 2 illustrates a non-limiting, exemplary method 200 of providing an emergency alert to one or more user devices. At block 210, an emergency alert is received. Such an alert may be a CMAM as described herein, and may be received from an Alert Gateway at a CMSP Gateway. Alternatively, such an alert may be received from any other type of device at any other type of device, and may be received over a wired or wireless data communications means.

At block 220, a geocode may be determined from the emergency alert received at block 210. A geocode may be determined using any effective means, including reading and interpreting a computer-readable representation of the geocode. The geocode may be represented in any manner, including as a set of characters or digits, and/or a set of bits representing a set of characters or digits. In one embodiment, the geocode is a set of or a binary representation of five characters or digits as described herein, with the first two characters or digits of the geocode identifying the state or region of a geographical area and the last three characters or digits of the geocode identifying a specific county, region, or equivalent entities within the state or region identified by the first two characters or digits.

At block 230, the specific cells or nodes of a network that are located within the area specified by the geocode, or are otherwise the appropriate cells or nodes based on the geocode, are determined. This may be accomplished using any computing device through any effective means, including database queries and computing algorithms. At block 240, a cell broadcast message is generated. The cell broadcast message may be an original message based on the emergency alert received at block 210, or it may include, encapsulate, or other consist of the emergency alert received at block 210. Note that the order of implementing method 200 may vary. For example, the cell broadcast message may be generated before or after the geocode is determined and/or the appropriate cells or nodes are determined. At block 250, the generated cell broadcast message may be transmitted to one or more of the base stations that service the cells or nodes determined at block 230.

By evaluating a simple code contained in a CMAS emergency alert, a CMSP operator may easily and effectively work with the CMAS to provide alerts to the appropriate users. The above described embodiments may be implemented using any type of devices, network elements, network connections, and any combination thereof. Described below are exemplary device and network embodiments that may be used to implement the methods and systems described above. As those skilled in the art will appreciate, alternative means and methods of encoding a geographical area in a CMAS emergency alert and processing a CMAS emergency alert containing an indication of a geographical area may be used and all such means and methods are contemplated as within the scope of the present disclosure.

Figure 3:
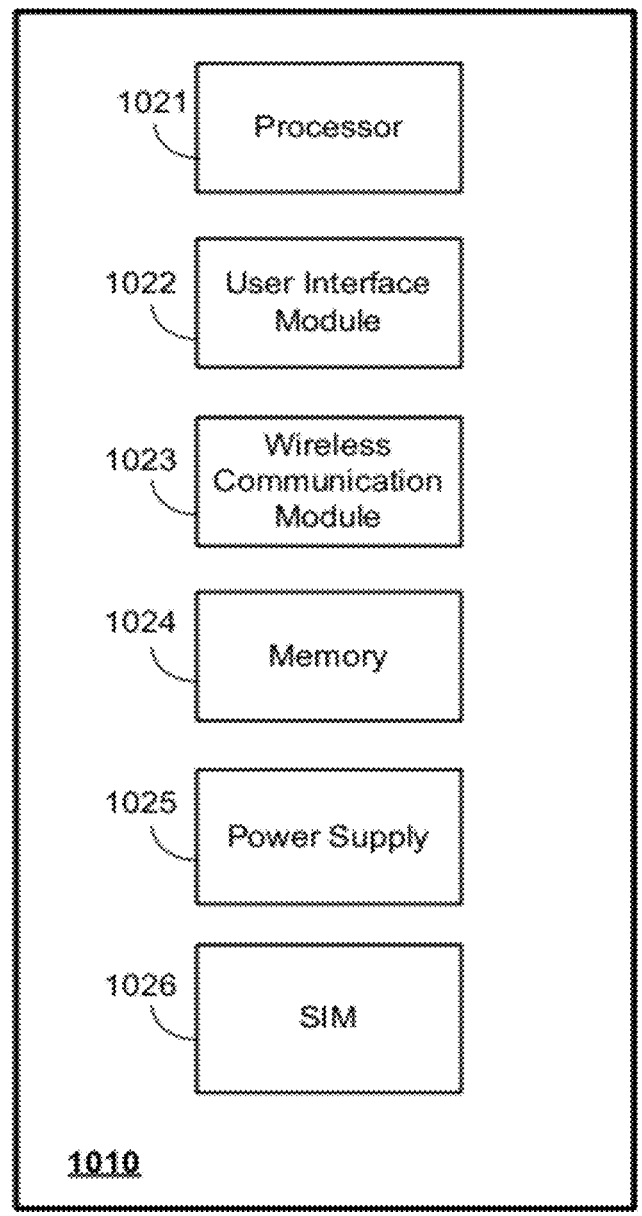
FIG. 3 is a block diagram of a non-limiting, exemplary wireless device that may be used in connection with an embodiment.

FIG. 3 illustrates an example wireless device 1010 that may be used in connection with an embodiment. References will also be made to other figures of the present disclosure as appropriate. For example, wireless devices 161-164 may each be a wireless device of the type described in regard to FIG. 3, and may have some, all, or none of the components and modules described in regard to FIG. 3. It will be appreciated that the components and modules of wireless device 1010 illustrated in FIG. 3 are illustrative, and that any number and type of components and/or modules may be present in wireless device 1010. In addition, the functions performed by any or all of the components and modules illustrated in FIG. 3 may be performed by any number of physical components. Thus, it is possible that in some embodiments the functionality of more than one component and/or module illustrated in FIG. 3 may be performed by any number or types of hardware and/or software.

Processor 1021 may be any type of circuitry that performs operations on behalf of wireless device 1010. In one embodiment, processor 1021 executes software (i.e., computer readable instructions stored on a computer readable medium) that may include functionality related to transmitting and receiving telephonic communications including CBS messages and/or CMAMs in some form, communicating with, operating, or interfacing with a CMSP network, and/or running software configured to operate, communicate, or interface with a CMSP network, for example. User interface module 1022 may be any type or combination of hardware and/or software that enables a user to operate and interact with wireless device 1010, and, in one embodiment, to interact with a system or software enabling the user to view, modify, or delete a CBS message such as those containing CMAM data as described herein. For example, user interface module 1022 may include a display, physical and/or "soft" keys, voice recognition software, microphone, speaker and the like. Wireless communication module 1023 may be any type or combination of hardware and/or software that enables wireless device 1010 to communicate with CMSP network equipment, for example, Base Transceiver Stations 151-153, or any other type of wireless communications network or network equipment. Memory 1024 enables wireless device 1010 to store information, such as a CBS message or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

SIM 1026 may be any type Subscriber Identity Module and may be configured on a removable or non-removable SIM card that allows wireless device 1010 to store data on SIM 1026.

Figure 4:
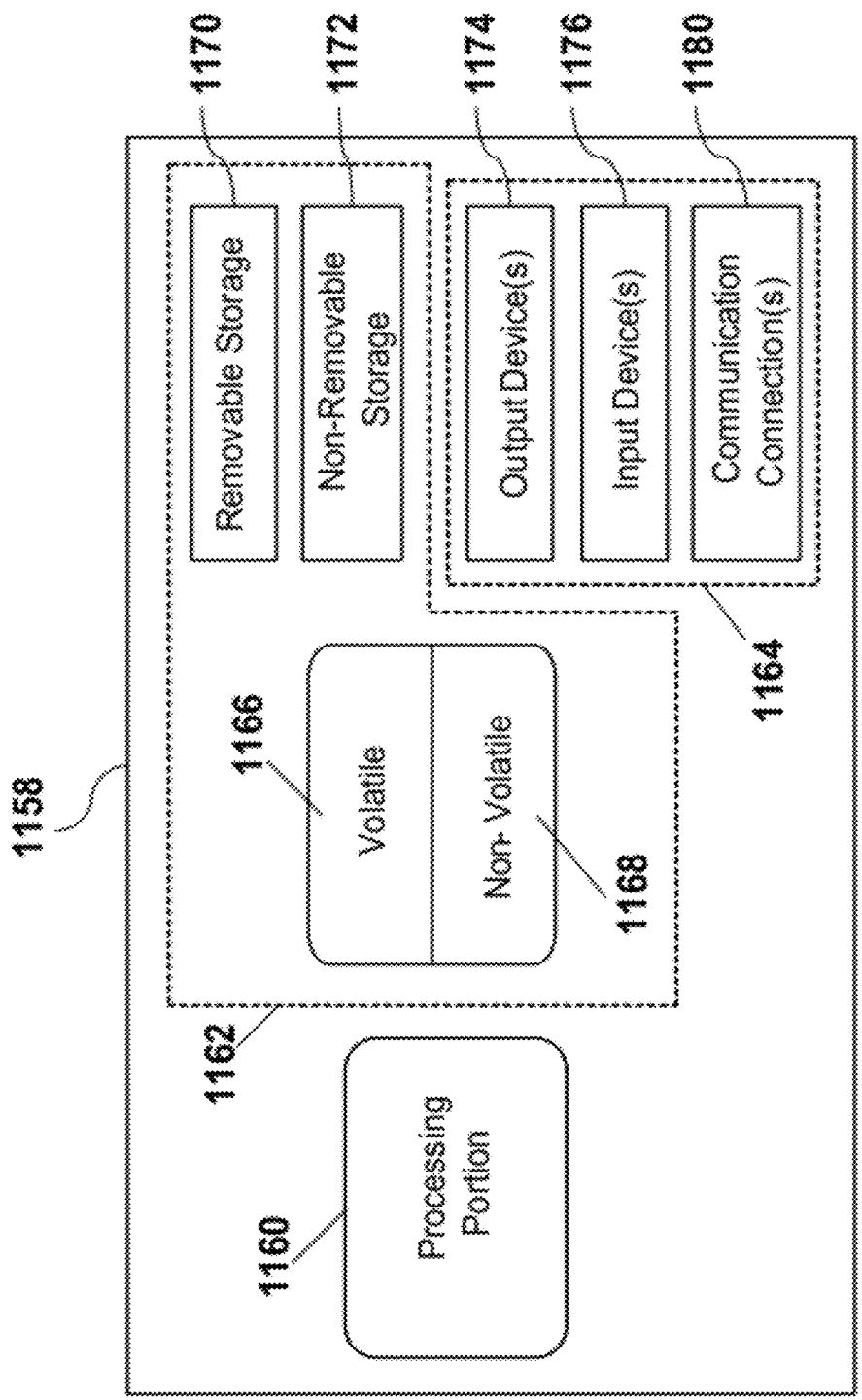
FIG. 4 is a block diagram of a non-limiting, exemplary processor in which the present subject matter may be implemented.

FIG. 4 is a block diagram of an example processor 1158 which may be employed in any of the embodiments described herein, including as one or more components of wireless devices 161-164, as one or more components of CMSP equipment or related equipment, such as any component shown in FIG. 1, and/or as one or more components of any third party system or subsystem that may implement any portion of the subject matter described herein, such as Alert Gateway 110. It is emphasized that the block diagram depicted in FIG. 4 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 4) to allow communications between these portions. The input/output portion 1164 is capable of providing and/or receiving components, commands, and/or instructions, utilized to, for example, determine a geocode from a CMAM, correlate a geocode to specific cells, nodes, base transceiver stations, or other devices, or perform any other type of cell broadcast or wireless communications function.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing CMAMs or cell broadcasts, geocodes, telephonic communications, data communications, etc. For example, as described above, the memory portion is capable of storing CMAMs and/or software capable of processing CMAMs. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through CMSP equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

CMSP networks and equipment as illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how cell broadcasts may be generated and transmitted based, at least in part, on a geocode, with stationary and non-stationary network structures and architectures. It can be appreciated, however, that methods and systems for encoding a geographical area in an emergency alert and processing an emergency alert containing an indication of a geographical area such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1×Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for encoding a geographical area in an emergency alert and processing an emergency alert containing an indication of a geographical area can be applied independently of the method of data transport, and do not depend on any particular network architecture, or underlying protocols.

Figure 5:
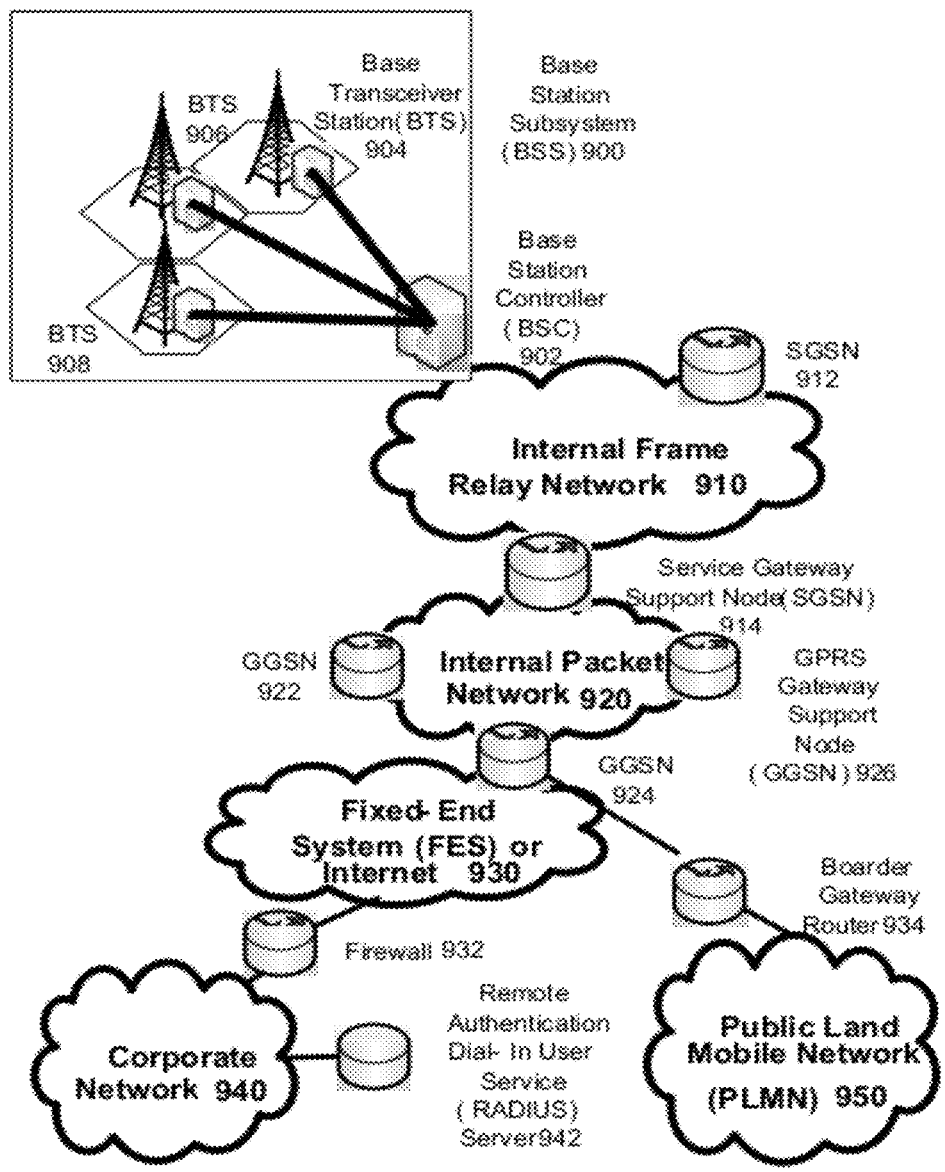
FIG. 5 is an overall block diagram of an exemplary packet-based mobile cellular network environment, such as a GPRS network, in which the present subject matter may be implemented.

FIG. 5 depicts an overall block diagram of an exemplary packet-based mobile cellular network environment, such as a GPRS network, in which the systems and methods for encoding a geographical area in an emergency alert and processing an emergency alert containing an indication of a geographical area such as those described herein can be practiced. In an example configuration, the CMSP equipment as illustrated in FIG. 1 may be encompassed by the network environment depicted in FIG. 5. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 161-164) become connected to the wireless network. In exemplary fashion, the packet traffic originating from user devices (e.g., wireless devices 161-164) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 6:
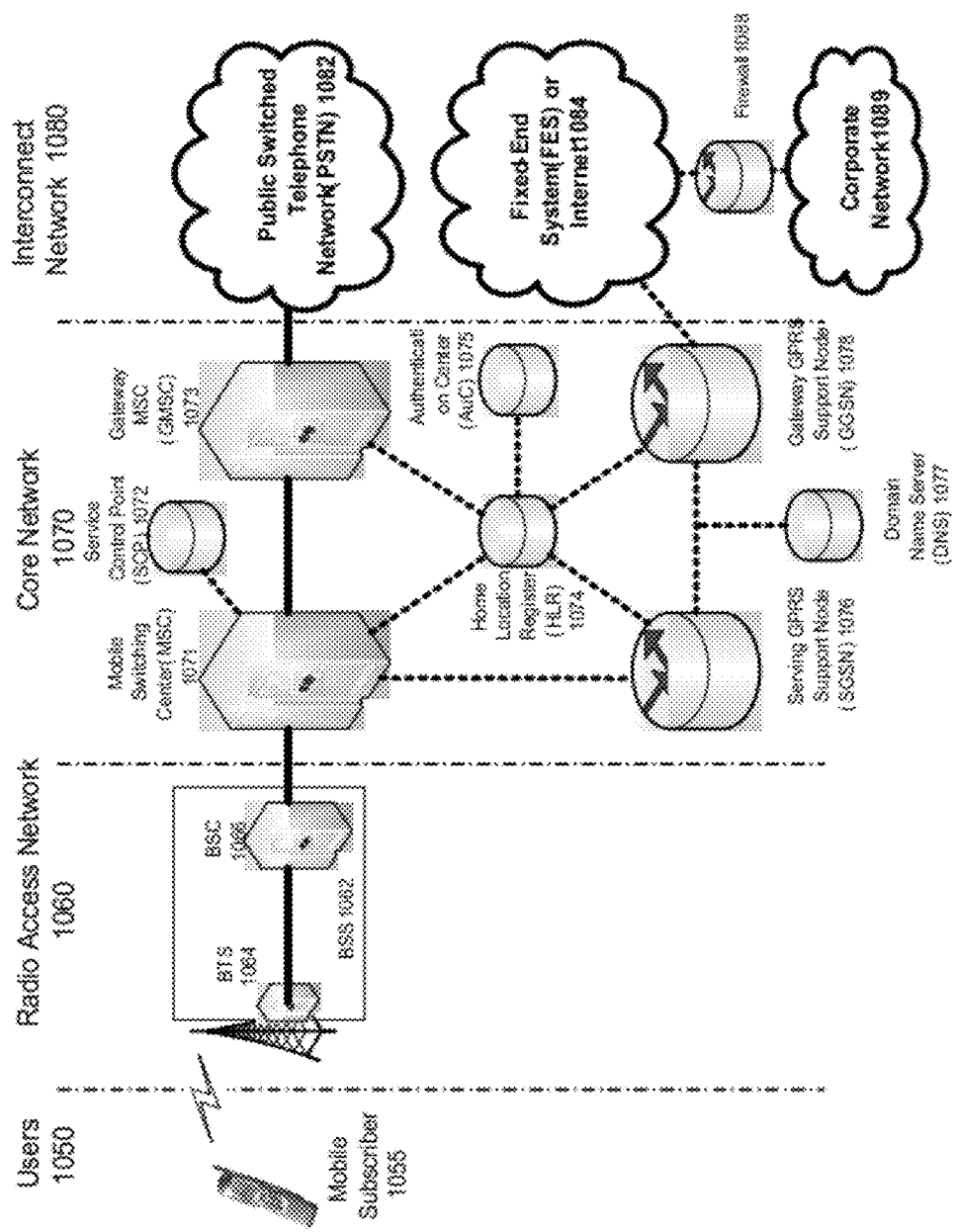
FIG. 6 illustrates a non-limiting, exemplary architecture of a typical GPRS network as segmented into four groups.

FIG. 6 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 6). In an example embodiment, the device depicted as mobile subscriber 1055 may comprise wireless devices 161-164. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 6, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 161-164 and 261-264, used by an end user of the mobile cellular service or a CMSP. When a mobile subscriber turns on his or her mobile device, the mobile device may go through an attach process by which the mobile device attaches to an SGSN of the GPRS network. In FIG. 6, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality for encoding a geographical area in an emergency alert and processing an emergency alert containing an indication of a geographical area such as those described herein can include but are not limited to Gateway GPRS Support Node tables, Fixed End System router tables, firewall systems, VPN tunnels, and any number of other network elements as required by the particular digital network.

Figure 7:
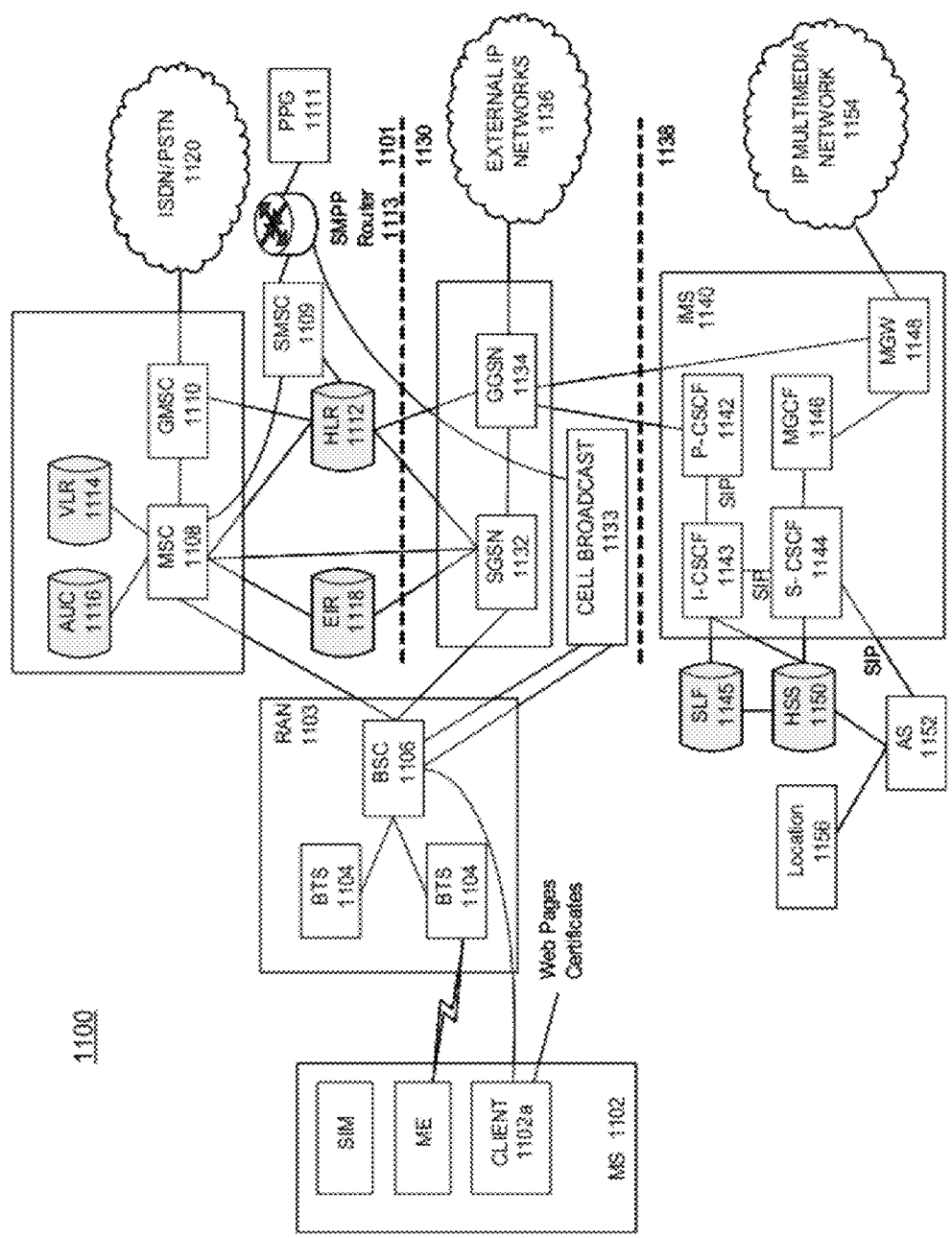
FIG. 7 illustrates a non-limiting alternate block diagram of an exemplary GSM/GPRS/IP multimedia network architecture in which the present subject matter may be implemented.

FIG. 7 illustrates another exemplary block diagram view of a GSM/GPRS/IP multimedia network architecture 1100 in which the systems and methods for encoding a geographical area in an emergency alert and processing an emergency alert containing an indication of a geographical area such as those described herein can be incorporated. As illustrated, architecture 1100 of FIG. 7 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 161-164) that is used by mobile subscribers, in one embodiment with a Subscriber identity Module (SIM). The SIM may include an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include geographical cell or node lists, and/or geocode encoding or decoding data. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain geographical cell or node lists, and/or geocode encoding or decoding data. The HLR 1112 and the VLR 1114, together with the MSC 1108, may provide the call routing and roaming capabilities of GSM, as well as geocode determination functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and may keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for encoding a geographical area in an emergency alert and processing an emergency alert containing an indication of a geographical area such as those described herein have been described in connection with various communications devices and computing devices/processors, the underlying concepts can be applied to any communications or computing device, processor, or system capable of implementing the geocode encoding and processing systems and methods described. The various techniques described herein can be implemented in connection with hardware or software or, where appropriate, with a combination of both. Thus, the methods and apparatuses for encoding a geographical area in an emergency alert and processing an emergency alert containing an indication of a geographical area, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for CMAS message mapping. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for encoding a geographical area in an emergency alert and processing an emergency alert containing an indication of a geographical area as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a geocode encoding and/or processing system. When implemented on a general-purpose processor, the program code combines with the processor to provide a unique apparatus that operates to invoke the functionality of a geocode encoding and/or processing system. Additionally, any storage techniques used in connection with a geocode encoding and/or processing system can invariably be a combination of hardware and software.

While the systems and methods for encoding a geographical area in an emergency alert and processing an emergency alert containing an indication of a geographical area have been described in connection with the various embodiments of the various figures, it is to be understood that other similar embodiments can be used or modifications and additions can be made to the described embodiments for performing the same functions of a geocode encoding and/or processing system without deviating from the described systems and methods. For example, one skilled in the art will recognize that a geocode encoding and/or processing system as described in the present application may apply to any environment, whether wired or wireless, and may be applied to any number of such devices connected via a communications network and interacting across the network. Therefore, geocode encoding and/or processing systems such as those described herein should not be limited to any single embodiment, but rather should be construed in breadth and scope in accordance with the appended claims.

What is claimed is:

1. A system comprising:
   memory comprising instructions; and
   a processor in communication with the memory, wherein the processor, when executing the instructions, performs operations comprising:
      receiving an emergency alert comprising a geographical code;
      determining a first subset of the geographical code comprising two characters;
      determining a second subset of the geographical code comprising three characters;
      determining a first geographical region based on the first subset of the geographical code;
      determining a second geographical region based on the second subset of the geographical code;
      determining a node associated with the first geographical region and the second geographical region; and
      transmitting a subset of contents of the emergency alert to the node.

2. The system of claim 1, wherein the emergency alert is a Commercial Mobile Alert Message (CMAM).

3. The system of claim 1, wherein determining a node comprises determining at least one device within a wireless communication network.

4. The system of claim 1, wherein the operations further comprise determining a priority of the emergency alert.

5. The system of claim 1, wherein transmitting the subset of the contents of the emergency alert to the node comprises mapping the subset of the contents of the emergency alert to a cell broadcast message.

6. The system of claim 1, wherein the three characters of the second subset of the geographical code represent at least one of a Federal Emergency Management Agency (FEMA) region or a National Weather Service (NWS) region.

7. The system of claim 1, wherein the two characters of the first subset of the geographical code represent a Federal Information Processing Standard state numeric code.

8. A method comprising:
receiving an emergency alert comprising a geographical code at a network device;
determining, at the network device, a first subset of the geographical code comprising two characters;
determining, at the network device, a second subset of the geographical code comprising three characters;
determining, at the network device, a first geographical region based on the first subset of the geographical code;
determining, at the network device, a second geographical region based on the second subset of the geographical code;
determining, at the network device, a node associated with the first geographical region and the second geographical region; and
transmitting a subset of contents of the emergency alert from the network device to the node.

9. The method of claim 8, wherein the emergency alert is a Commercial Mobile Alert Message (CMAM).

10. The method of claim 8, wherein determining a node comprises determining at least one device within a wireless communication network.

11. The method of claim 8, further comprising determining a priority of the emergency alert.

12. The method of claim 8, wherein transmitting the subset of the contents of the emergency alert to the node comprises mapping the subset of the contents of the emergency alert to a cell broadcast message.

13. The method of claim 8, wherein the three characters of the second subset of the geographical code represent at least one of a Federal Emergency Management Agency (FEMA) region or a National Weather Service (NWS) region.

14. The method of claim 8, wherein the two characters of the first subset of the geographical code represent a Federal Information Processing Standard state numeric code.

15. A computer-readable medium that is not a transient signal, the computer-readable medium comprising computer-executable instructions to:
receive an emergency alert comprising a geographical code;
determine a first subset of the geographical code comprising two characters;
determine a second subset of the geographical code comprising three characters;
determine a first geographical region based on the first subset of the geographical code;
determine a second geographical region based on the second subset of the geographical code;
determine a node associated with the first geographical region and the second geographical region; and
transmit a subset of contents of the emergency alert to the node.

16. The computer-readable medium of claim 15, wherein the emergency alert is a Commercial Mobile Alert Message (CMAM).

17. The computer-readable medium of claim 15, wherein the instructions to determine a node comprise instructions to determine at least one device within a wireless communication network.

18. The computer-readable medium of claim 15, further comprising computer-executable instructions to determine a priority of the emergency alert.

19. The computer-readable medium of claim 15, wherein the instructions to transmit the subset of the contents of the emergency alert to the node comprise instructions to map the subset of the contents of the emergency alert to a cell broadcast message.

20. The computer-readable medium of claim 15, wherein the three characters of the second subset of the geographical code represent at least one of a Federal Emergency Management Agency (FEMA) region or a National Weather Service (NWS) region.

* * * * *